US006810547B2

(12) United States Patent
Hung

(10) Patent No.: US 6,810,547 B2
(45) Date of Patent: Nov. 2, 2004

(54) VEHICLE WAXING/BUFFING APPLIANCE WITH REMOVEABLE/REPOSITIONING HANDLE

(75) Inventor: Michael Hung, Tao Yuan (TW)

(73) Assignee: Shinn Fu Corporation (TW)

( * ) Notice: Subject to any disclaimer, the term of this patent is extended or adjusted under 35 U.S.C. 154(b) by 109 days.

(21) Appl. No.: 09/945,838

(22) Filed: Sep. 5, 2001

(65) Prior Publication Data

US 2002/0182991 A1 Dec. 5, 2002

(30) Foreign Application Priority Data

Jun. 5, 2001 (CN) ....................................... 01226520 U

(51) Int. Cl.[7] ............................. B24B 29/02; B60S 3/06

(52) U.S. Cl. ........................... 15/28; 15/97.1; 15/144.1; 451/359

(58) Field of Search ................................ 15/22.1, 22.2, 15/49.1, 144.1, 97.1, 28; 451/359, 357, 354; 403/296, 292, 299; 16/422

(56) References Cited

U.S. PATENT DOCUMENTS 1,954,977 A * 4/1934 Albertson .................... 174/46
3,864,051 A * 2/1975 Reid ........................ 403/408.1
5,231,727 A * 8/1993 Armbruster ................. 15/97.1
5,365,628 A * 11/1994 Evensen ........................ 15/23
5,649,508 A * 7/1997 Rost et al. .................. 222/191
5,725,422 A * 3/1998 Leweck ...................... 451/359
5,775,982 A * 7/1998 Paterno ...................... 451/359
5,830,047 A * 11/1998 McCracken ................. 451/357
6,266,850 B1 * 7/2001 Williams et al. .............. 16/430

OTHER PUBLICATIONS

Merriamwebster.com, Jan. 20, 2004.*

* cited by examiner

*Primary Examiner*—Gary K. Graham
*Assistant Examiner*—Shay L Balsis
(74) *Attorney, Agent, or Firm*—Bacon & Thomas, PLLC

(57) ABSTRACT

A vehicle waxing/buffing appliance capable of having a removable/repositionable secondary handle. The appliance includes at least one adaptor to receive and hold the handle installed in the outer plastic molded housing. The user may install or reposition the handle as desired to help in both the efficiency of the operation and the comfort of the user.

7 Claims, 11 Drawing Sheets

VEHICLE WAXING/BUFFING APPLIANCE WITH REMOVEABLE/REPOSITIONING HANDLE

FIELD OF THE INVENTION

The present invention relates to a vehicle Waxing/Buffing appliance with a removeable, repositioning handle, which consists of a waxing/buffing appliance (hereon referred to as "appliance") and a handle. At least one attaching handle adaptor is built into the Outer Housing of the appliance to allow the independent handle to be attached to same. Therefore the user of the appliance may install the handle as needed to help in holding the appliance more easily and with better control during the waxing/buffing operation.

BACKGROUND OF THE INVENTION

Referring to FIGS. 1 and 2 the prior art appliance is shown to be easily held. The upper portion thereof is formed with an outer housing 10. The Interior of this housing contains the electric motor. At the bottom of the outer housing is the circular sponge waxing disk 20. In operation of the appliance, the motor drives the Disk in a rotary (or orbital) fashion. In general the waxing/buffing appliances in prior art have a peripheral handle 101 (refer to FIG. 1) that goes all the way around the housing, or two separate handles 102 that protrude from each side and are built into the housing (refer to FIG. 2). Thereby the user may hold the appliance anywhere on its periphery (FIG. 1) or at each end of the separate handles (FIG. 2). With either handle being attached to the main housing the user may apply a force downwards during the operation of the appliance.

This prior art has a fixed structure of the handle (s) being an integral part of the housing therefore the orientation of the appliance or the holding position cannot be changed as desired, i.e. the waxing/buffing cannot be positioned according to the habit or comfort of the user, especially as when the appliance pad is rotating the housing will try to rotate at same time. The peripheral handle has no mechanism for preventing the rotating of the housing. That is the holding force to prevent the housing from rotating is not provided so the hand will tend to slide around the housing. Furthermore the handles of the prior art are an integral part of the housing in a fixed position so they cannot be moved, or detached. This also means the handle can create the inconvenient and costly need for a larger packing box for transportation and storage due to its protruding design.

SUMMARY OF THE INVENTION

Accordingly, the prime object of the present invention is to provide a vehicle waxing/buffing appliance which is capable of having a removable/repositionable handle and comprises the said appliance and the handle. The housing of the appliance has at least one built in adaptor to allow the it handle to be attached as desired to allow the user to hold the appliance more easily. As a result the operation of the appliance is more convenient. The handle can easily be detached for transportation or storage thus the volume occupied and the packaging material is reduced. The user is able to hold the fixed handle and the detachable handle to apply a downward force during the operation thus the housing is easily prevented from its trying to rotate due to the reaction force and the whole waxing/buffing operation is more efficiently accomplished.

Another object of the present invention is to provide a vehicle waxing/buffing appliance being able to have a removeable/repositionable handle positioned into a nut which is molded or inserted into the outer housing, and the handle is thus screwed into this nut. One end of the handle is formed with a male thread. The handle is thus installed into the housing as desired so as to allow more comfort and efficiency in the operation.

Another object of the present invention is to provide the appliance capable of having the handle installed with male threads at each end. One thread end has a right angle thread and the other end has a left hand thread. The handle also has a cylindrical push on cover which covers the thread not in use. This left and right hand thread allows the handle to be inserted into adaptors built into each side of the housing and with the forces of the rotating appliance the thread will tend to self-tighten in the adaptor and not vibrate out.

Another object of the present invention is to provide a waxing/buffing appliance capable of having a removeable/repositionable handle, wherein the receiving adaptors in the housing have a rectangular shape outer construction with an inner rectangular hole. Two of the opposite walls of the inner rectangular hole have built-in concave holes. The front end of the handle also has a matching rectangular shape with a cross sectional hole, the axis of which matches the axis of the holes in the housing adaptor. In this handle hole are two steel ball bearings sitting on a compression spring. As a result the balls are under an outward pressure and slightly exposed, and when pressure is applied to the balls, they retract slightly into the handle hole. So the user is able to quickly attach/detach the handle to the housing by pushing/pulling the handle to allow the balls to pressure/depressure themselves into/out of the concave holes of the housing.

The various objects and advantages of the present invention will be more easily understood from the following detailed description when read in conjunction with the appended drawings.

DETAILED DESCRIPTION OF THE INVENTION

Figure 1:
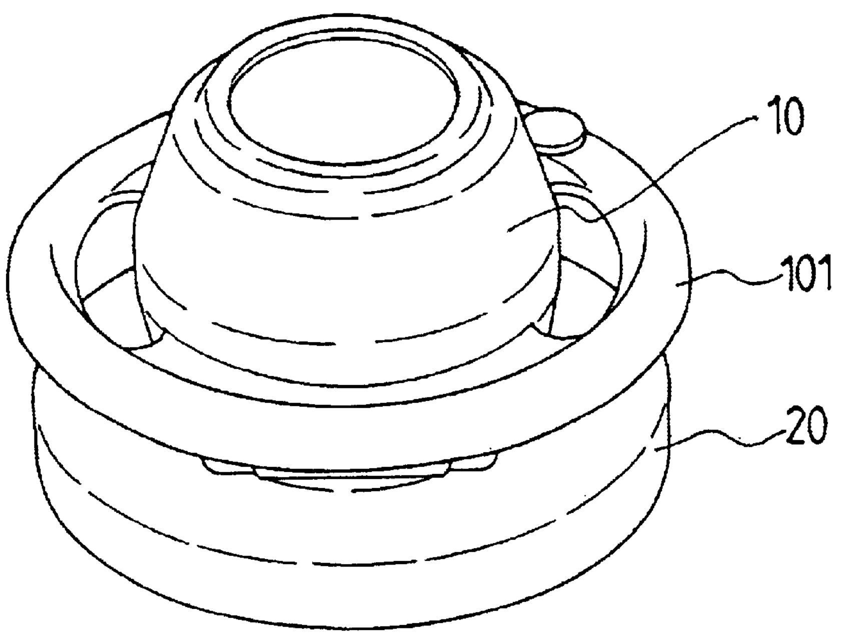
FIG. 1 PRIOR ART
FIG. 1 is a schematic view of a prior waxing/buffing appliance.
Figure 2:
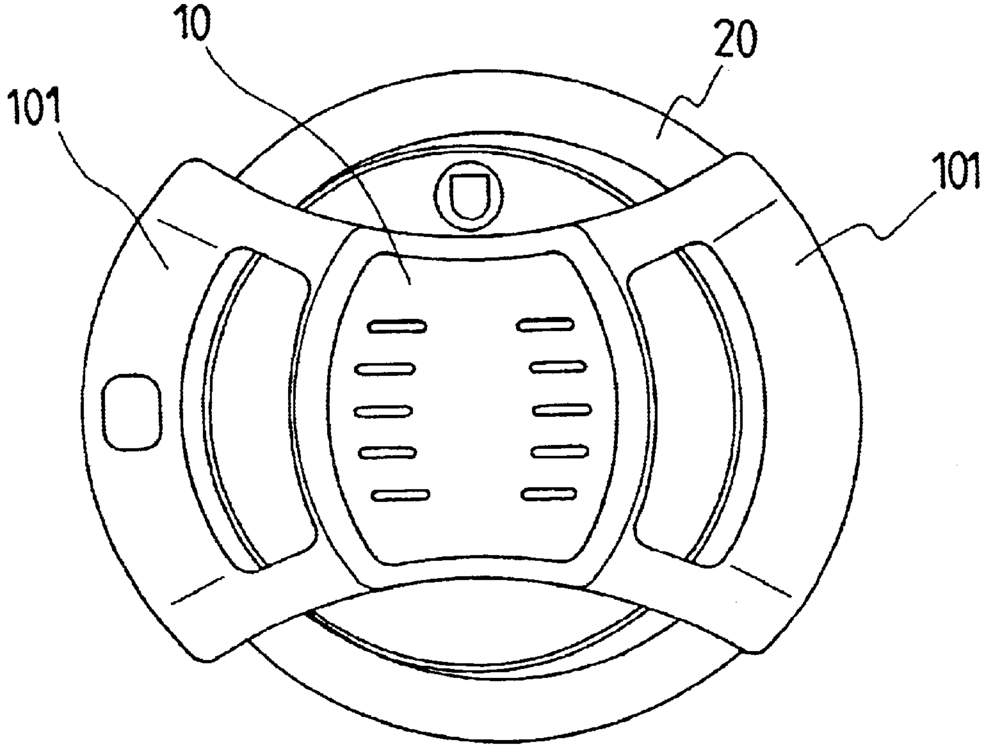
FIG. 2 PRIOR ART
FIG. 2 is another schematic view of a prior waxing/buffing appliance.
Figure 3:
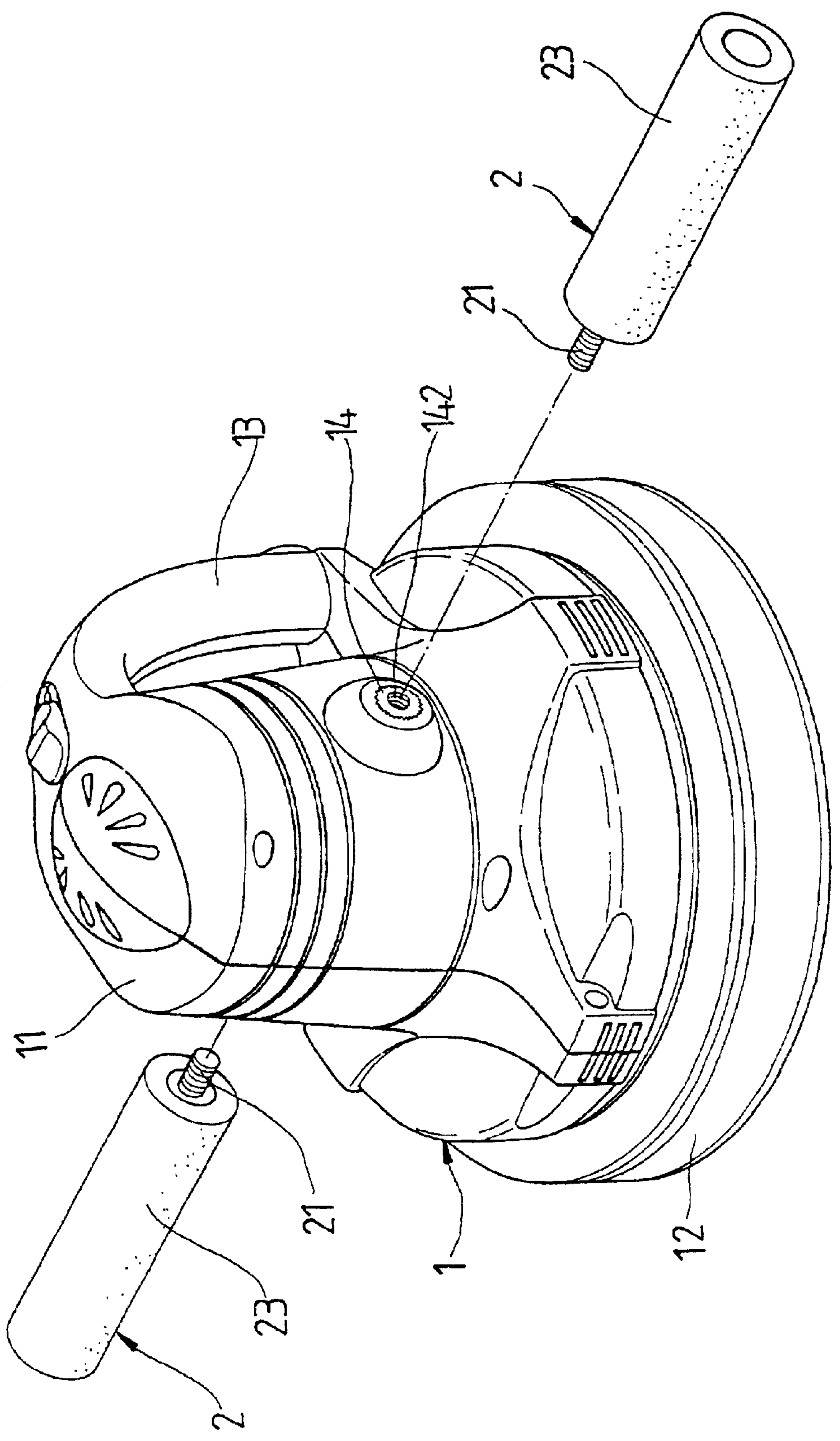
FIG. 3 is an exploded perspective view of the waxing/buffing appliance and removeable and replaceable handle.
Figure 4:
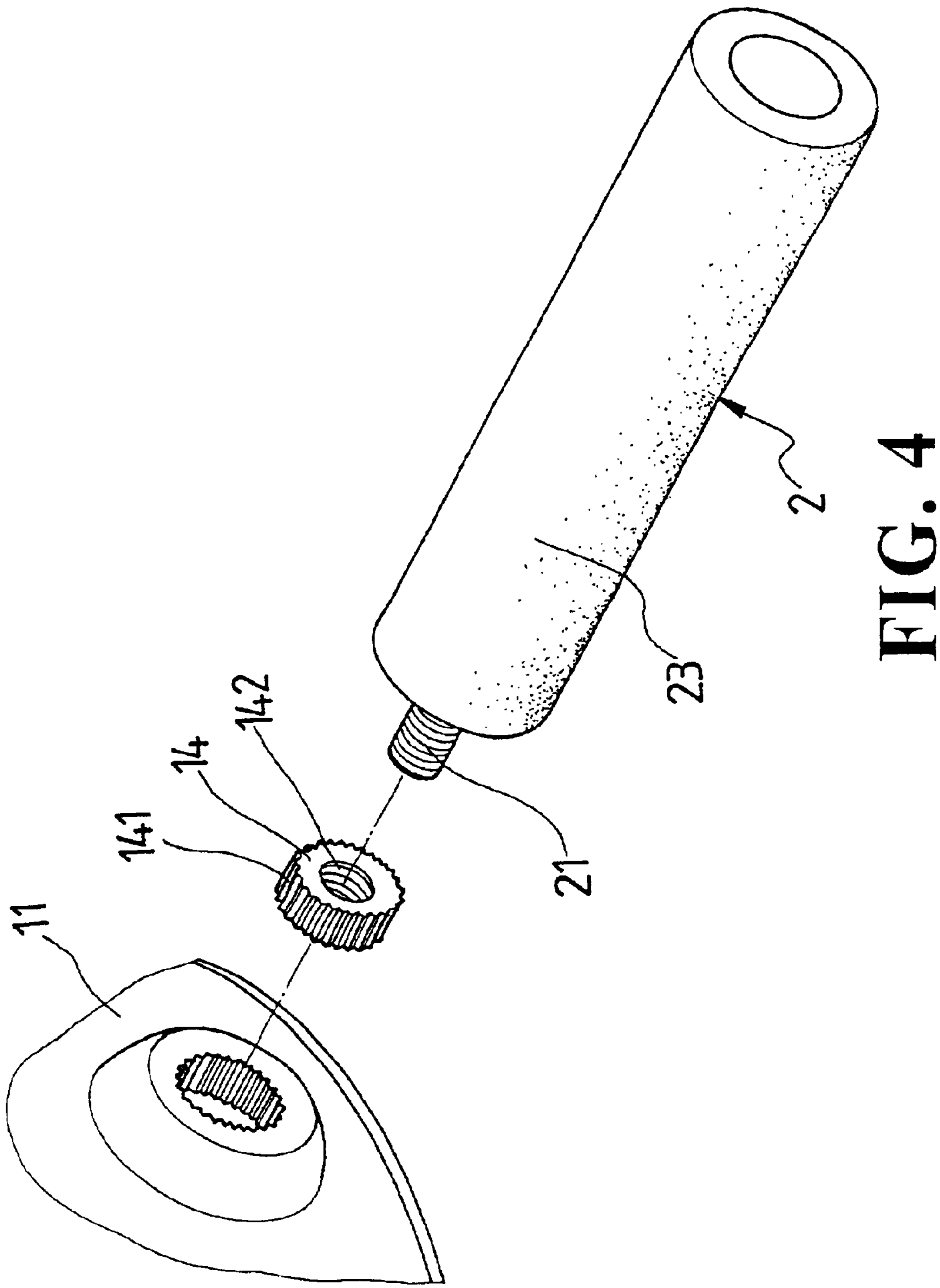
FIG. 4 is an exploded perspective view of the waxing/buffing appliances, detailing the housing adaptor and handle of the present invention.

Referring to FIGS. 3 and 4, the appliance, capable of having a removable repositionable handle installed, is illustrated. The present invention includes a waxing/buffing appliance 1 and a handle 2.

The appliance 1 is a portable appliance for waxing/buffing the surface of a vehicle. The appliance has an outer molded plastic housing 11. The housing has an internal electrical motor, an outer power switch, etc. A rotatable sponge waxing disk 12 is installed on the extended spindle (not shown) of the motor protruding from base of housing 11. The rear side of the housing has a built-in vertical holding handle. Around the periphery of the housing at the left side, right side and other radial positions are adaptors (at least one) molded in (see FIG. 5). These adaptors can consist of an adaptor 14 in the shape of a nut, with an outer contour 141 which by being molded in, prevent the nut from rotating. The inner thread 142 of this nut is used to locate and hold the handle in required position.

The handle 2 is a diametrical shape and the front end has a concentric male thread 21 attached. The body of the handle can be installed with a sponge cover 23 for more comfort.

Figure 6:
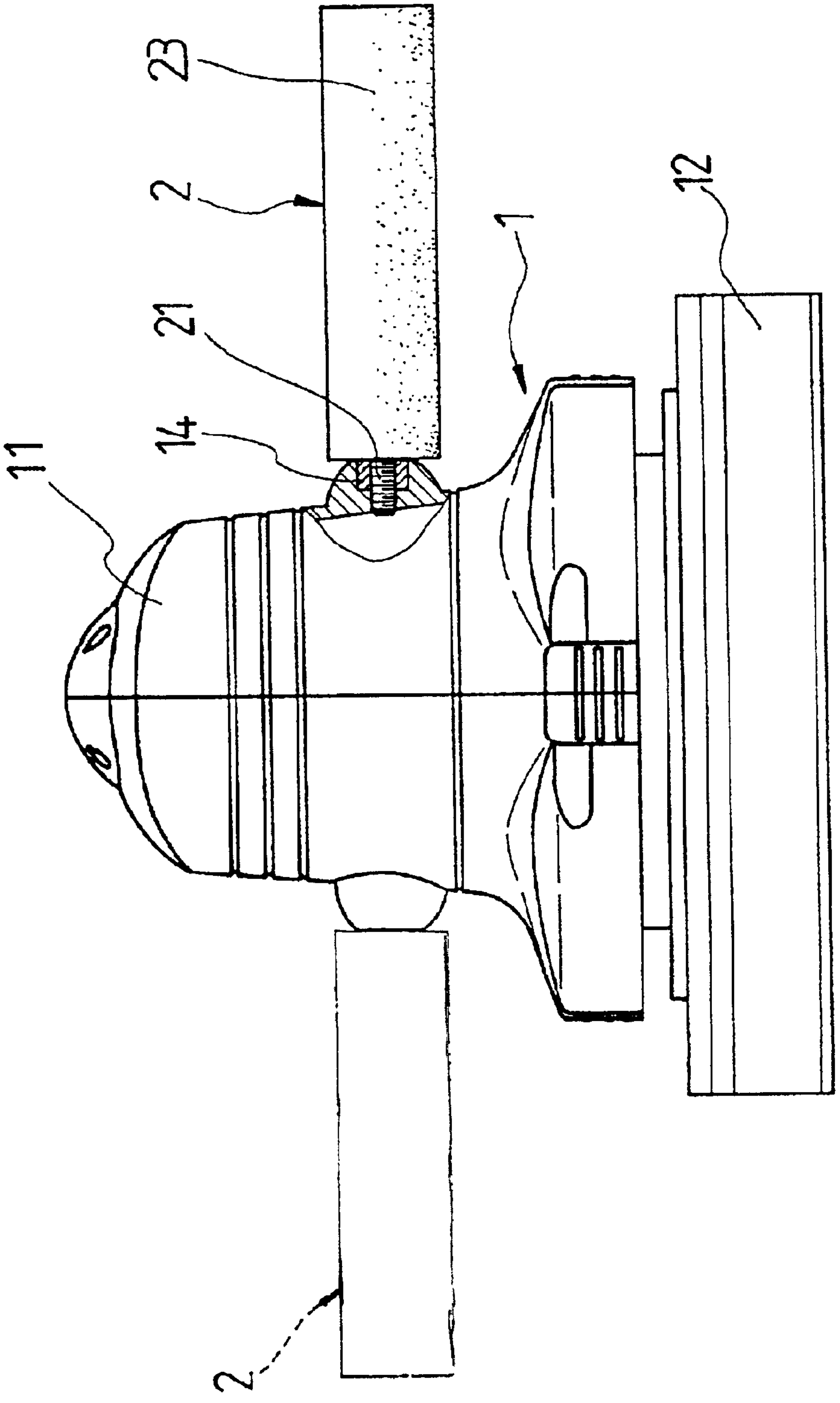
FIG. 6 is a schematic view of the waxing/buffing appliance capable of having a removable/repositionable handle as per the scope of the present invention.
Figure 7:
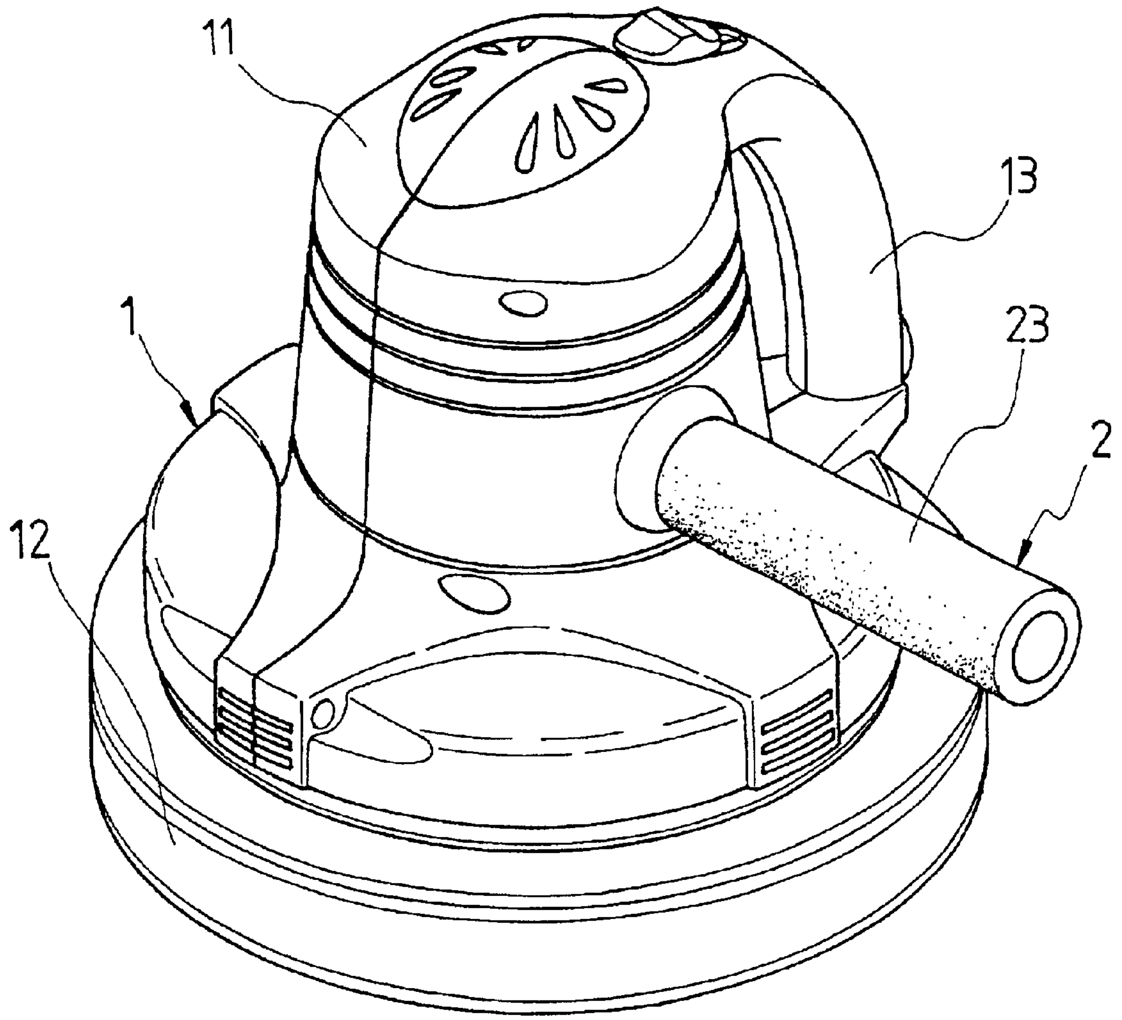
FIG. 7. is a perspective view of the appliance with the handle installed as per the scope of the present invention.
Figure 8:
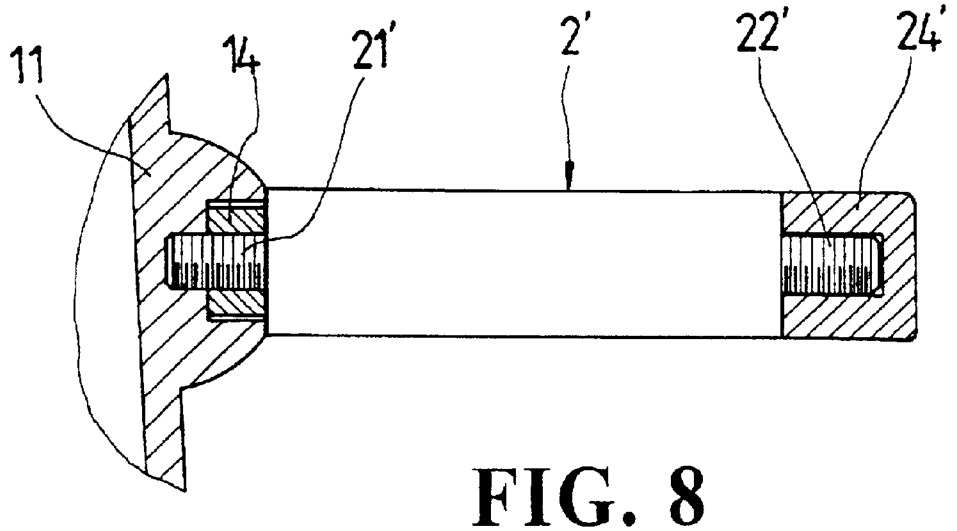
FIG. 8. is a partial schematic view of another embodiment of the present invention.

By the combination of the rear vertical handle 13 and the inserted adaptors 14 at the left side of and integral with the housing 11 and the handle screwed into a respective one of the adaptors, a suitable setup for the user to apply force is accomplished. Therefore the left side of the appliance has at least one horizontal side handle. In waxing/buffing, the user may hold the side handle 2 and the vertical rear handle 13 and apply a downward pressure so as to facilitate the waxing and buffing of the vehicle. Therefore by the resisting force of the horizontal handle 2 and the rear vertical handle 13 the housing is held positively to stop the reactionary tendency to rotate (torque of the motor). This prevents the hand from sliding around the peripheral handle as in the prior art. The handle 2 of this present invention can be installed in the adaptor 14 at the right side of the appliance so that a horizontal handle is formed at the right side of the appliance 1 (FIGS. 6 and 7) so as to better suit the comfort and dexterity of the user. So again by the combination of the right hand horizontal handle and the rear vertical handle, the best user comfort and efficiency is attained.

Figure 5:
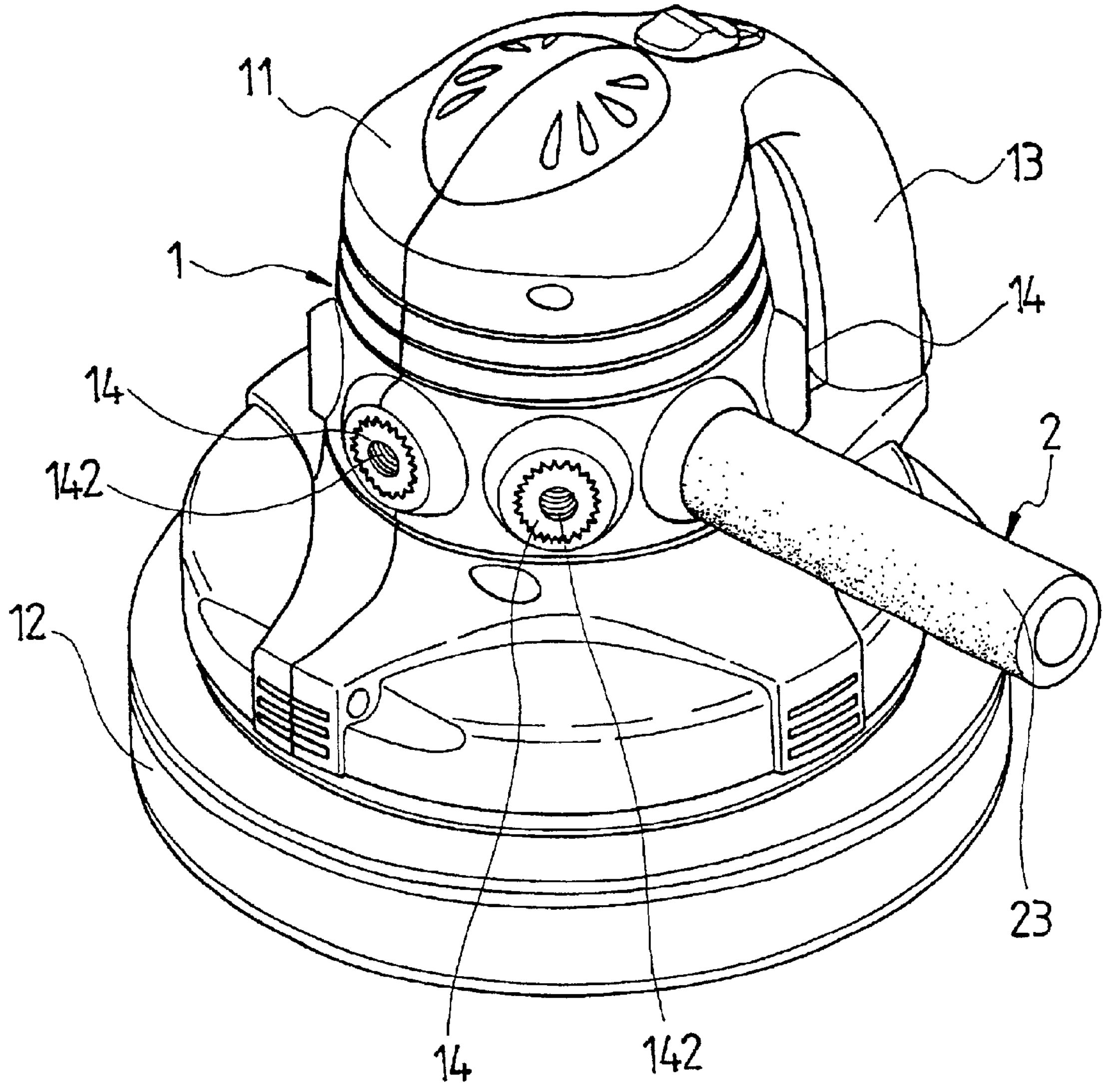
FIG. 5 is a schematic view of the adaptors at various positions around the housing according to the present invention.

Moreover by the adaptors 14 being positioned at various selected positions around the periphery of the housing 11 the handle can easily be attached at various positions depending on the users own need and comfort (as shown in FIG. 5). Again by utilizing this handle 2 in required or desired position, in conjunction with the rear vertical handle an efficient use of the appliance is obtained. Furthermore each of the right hand and left hand adaptors 14 can be utilised with a handle 2 inserted at both positions simultaneously to allow another possible comfortable setup for the user by using both horizontal handles at same time. Both horizontal handles can be detached for transportation or storage of the appliance, thus saving the volume of space and the packaging materials needed.

Figure 9:
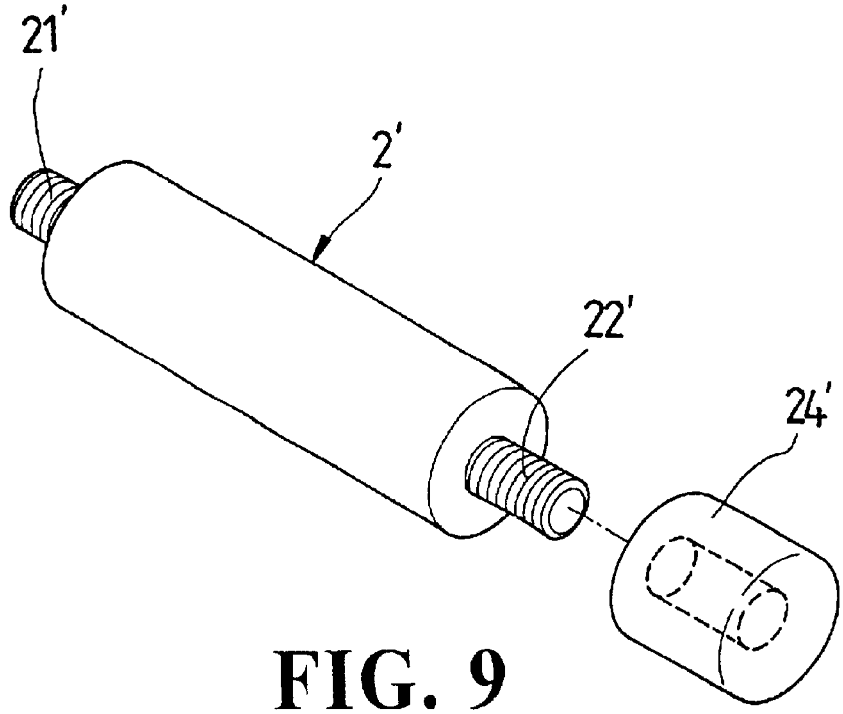
FIG. 9. is an exploded perspective view of the handle of the embodiment of FIG. 8.
Figure 10:
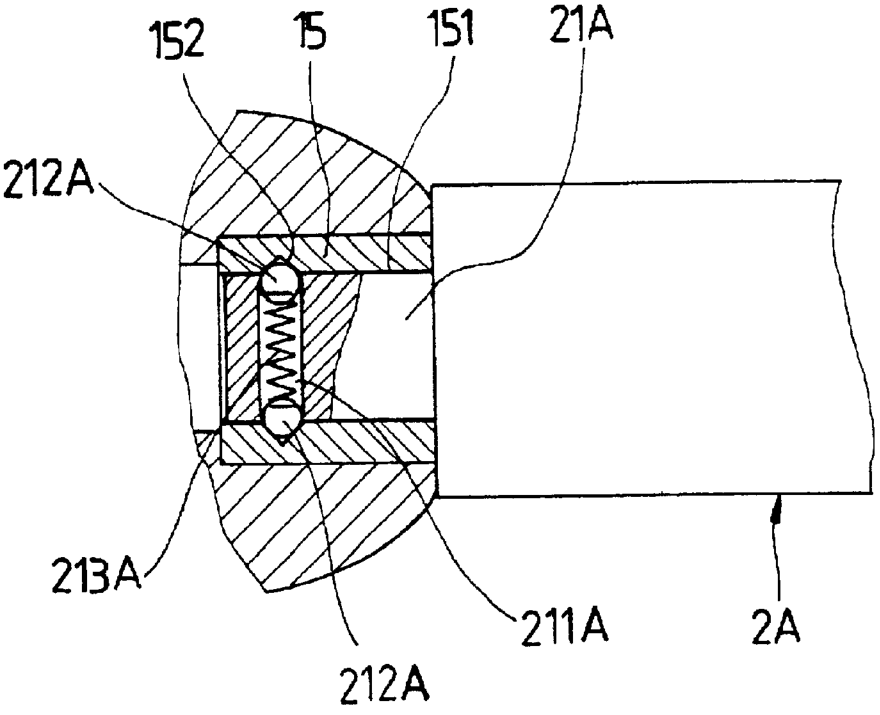
FIG. 10 is a schematic view of another embodiment of the housing adaptor and the handle of the present invention.

Furthermore with the adaptors 14 built into both sides of the housing, the handle 2 can be replaced with a handle 2' which has male threads at both ends 21' and 22' (FIGS. 9 and 10). The adaptors on the housing can have a left hand thread at the left side and a right hand thread at the right side. The handle has a right hand thread at one extreme and a left hand thread at the other.

The handle of FIGS. 9 and 10 also comes with a push on cover 24' over either thread. Therefore depending on the dexterity and comfort of the user, the handle can be installed at either the left or right side of the housing and the exposed thread that is left after installation is covered by the cover 24'. This left or right installation is improved by the left or right hand threads on the handle being in a continuous tightening mode during the operation of the appliance. As a result of this, a more comfortable and efficient operation is attained whether user is naturally right handed or left handed.

Figure 11:
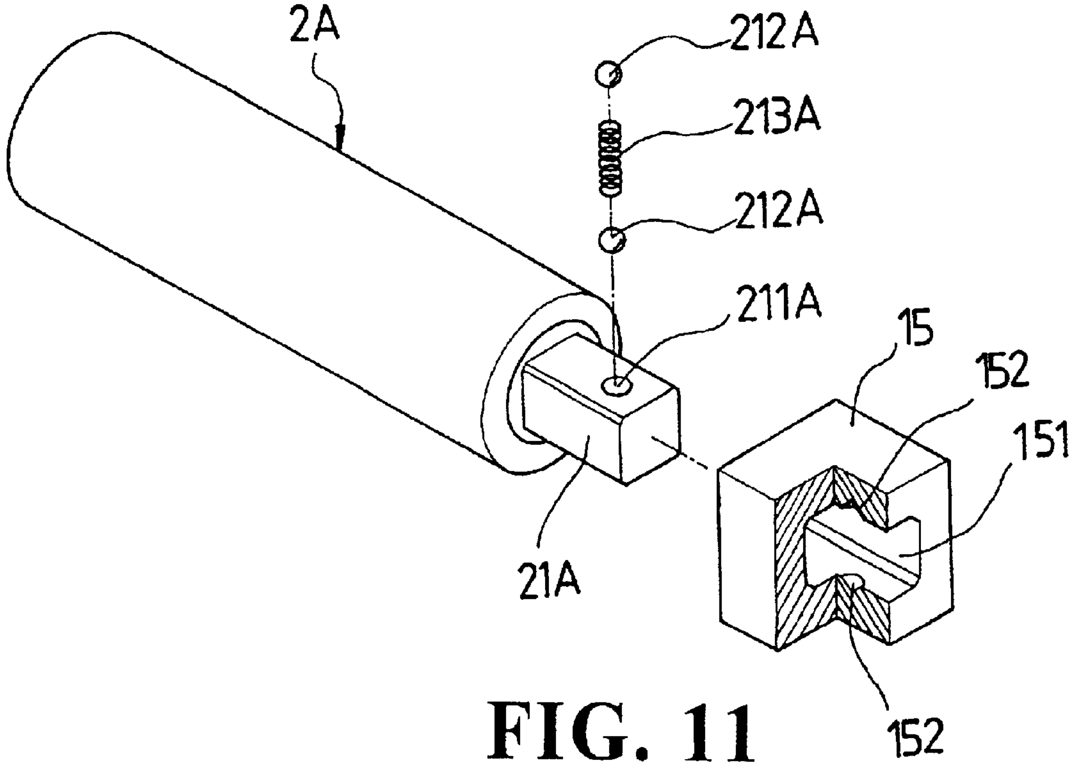
FIG. 11. is an exploded perspective view of a further embodiment of the handle of the present invention.
Figure 12:
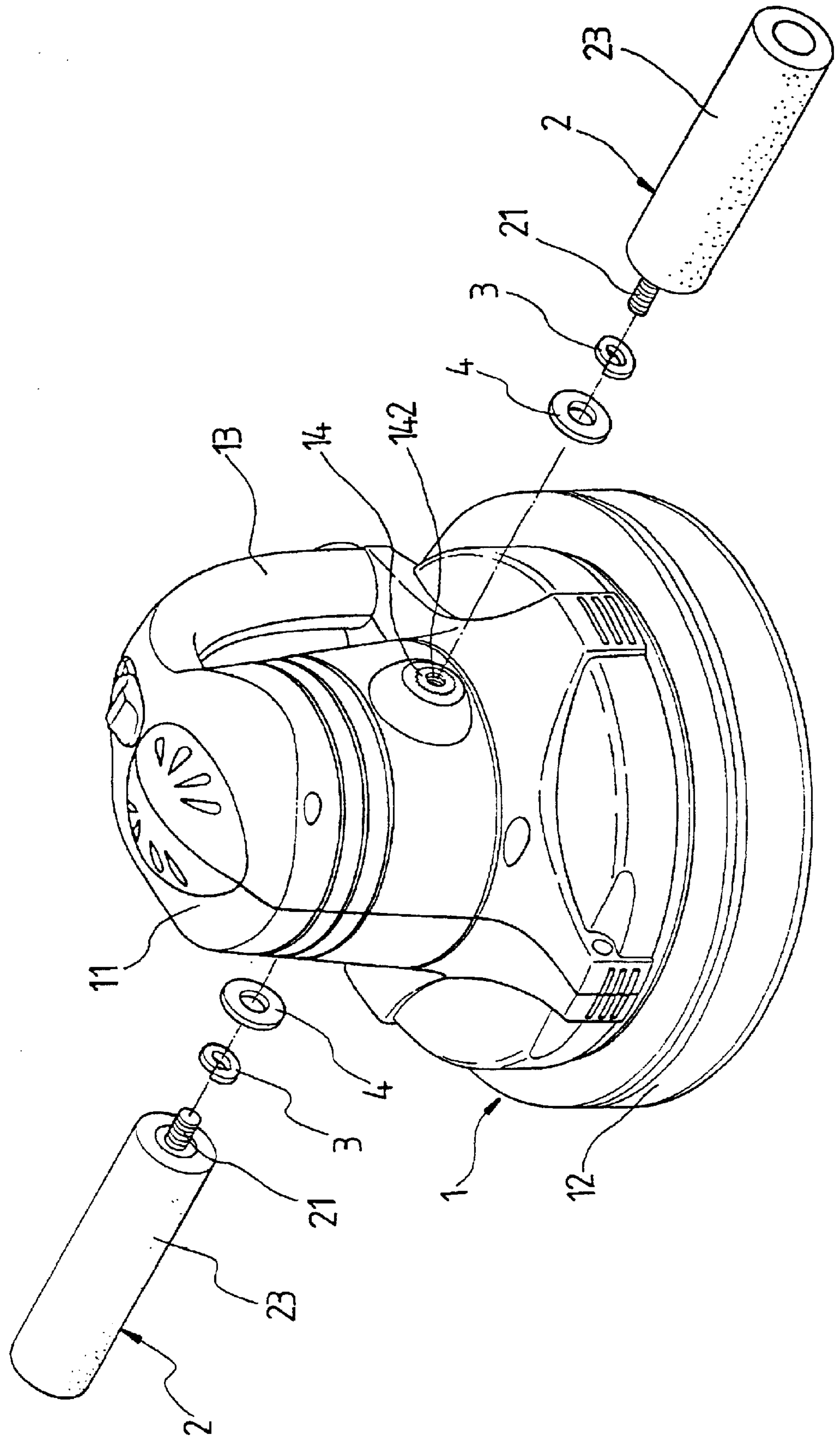
FIG. 12. is an exploded perspective view of another embodiment of the present invention.

Moreover, in the present invention the adaptors that are embedded in the outer housing, (see FIGS. 10 and 11) at each side may consist of a rectangular shaped construction 15 with an inner rectangular hole 151 on a centerline Two of the opposite walls of the inner rectangular hole, each has a built-in concave hole 152. The front end of the handle 2A has a matching rectangular protrusion shape 21A with a cross-sectional hole 211A. Then two steel balls 212A are fitted within this hole sitting on a compression spring 213A. The outer edges of the hole 211A are staked so that the balls 212A are retained in the hole 211A under outward pressure from the compression spring 213A, and yet the steel balls protrude slightly from handle 2A. As the front handle section 21A is inserted into the rectangular hole 151 of the adaptor 15 then the two balls ride back into the hole compressing the spring. Upon the balls reaching the concave holes 152 the compression spring forces the ball into the same concave hole thus locking it in position, and yet with an outer pull on the handle the balls again retreat allowing the handle to be disconnected easily and quickly.

Figure 13:
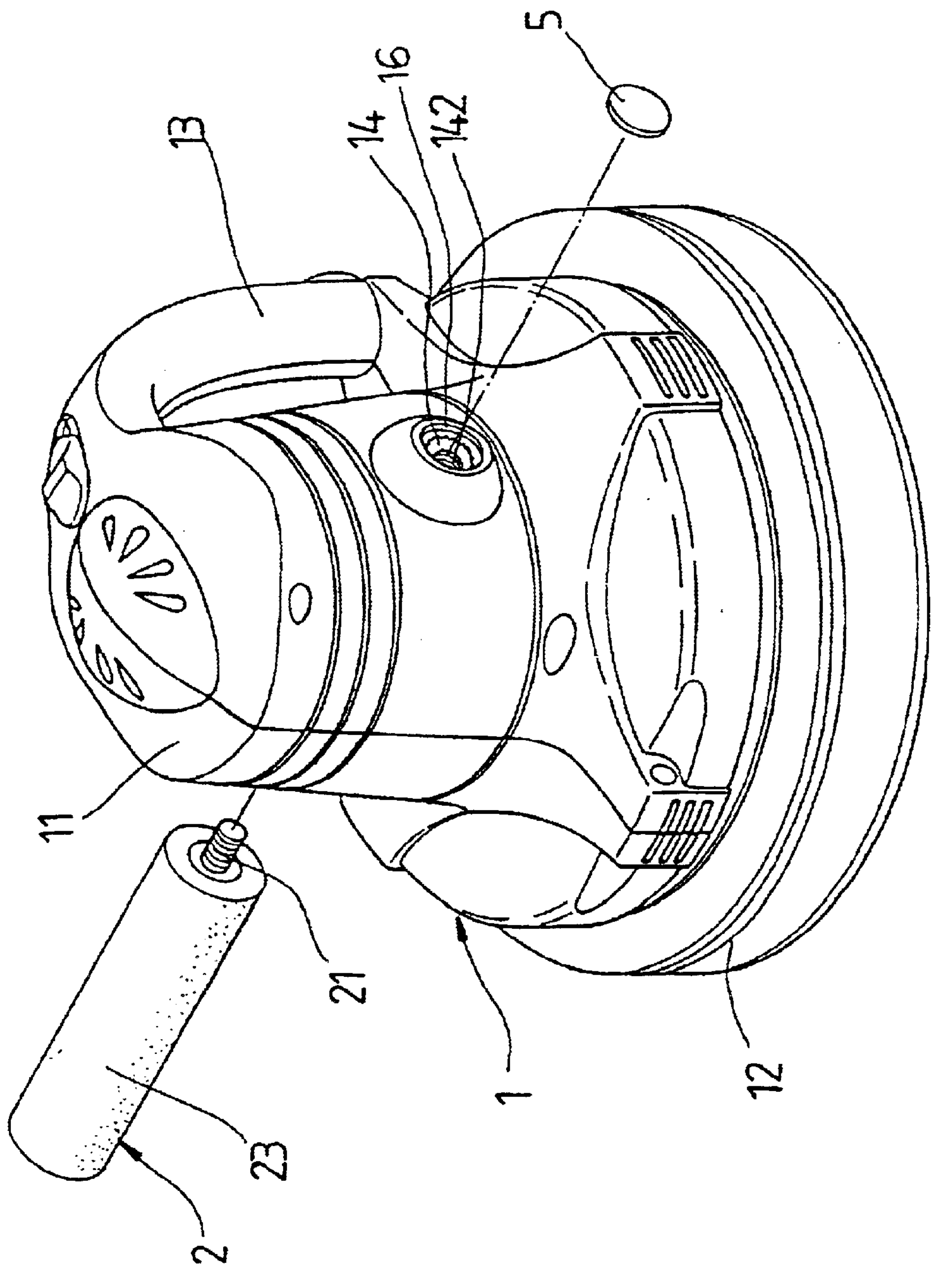
FIG. 13 is an exploded perspective view of another embodiment of the present invention.

Moreover, in the present invention, the horizontal removeable and repositioning handle 2 is screwed into the housing 1 of the appliance, on the left or right side. However a spring washer 3 and a plastic washer 4 can be installed on the threaded rod to help lock the handle in place so that it does not start to come loose during operation. Referring to FIG. 13, in the housing of the present invention a recess 16 can be formed at the outer periphery of the section where the adaptor is located to allow the use of a sealing piece 5 to be installed in the recess on the side of the housing where the handle is not being installed. This not only protects the threads not being used but give a more pleasing appearance to the product.

Figure 14:
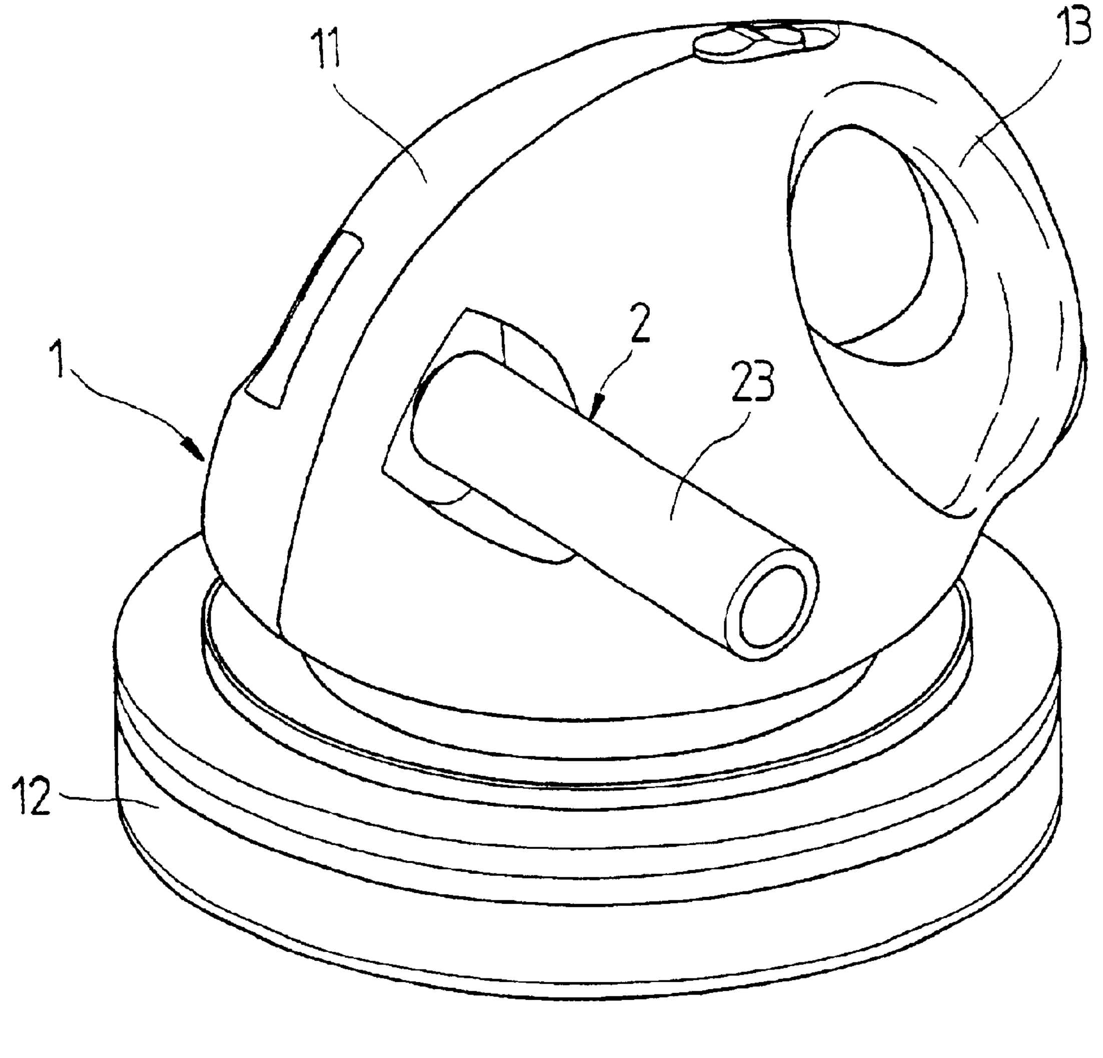
FIG. 14 is a perspective view of another embodiment of the appliance of the present invention.

It should be understood that in the present invention, a vertical rear handle 13 is combined with one or more side horizontal handles and, the outer look of the housing can vary from the shape shown. For example a different shape housing 11 is shown in FIG. 14 while still using the vertical handle at the back and the one or more horizontal handles mounted on the outer sides.

The present invention is thus described and it will be obvious that the same may be varied in many other ways. Such variations are not to be regarded as a departure from the spirit and scope of this present invention claimed and all such modifications as would be obvious to one skilled in the art are intended to be included within the scope of the following claims.

What is claimed is:

1. A vehicle waxing and buffing appliance comprising:

an outer molded plastic housing having a longitudinal axis;

an electrical motor housed within the housing, the motor having a drive shaft;

a waxing disk attached to an extension on the drive shaft of the motor;

a vertical handle integral with the housing, substantially parallel to the longitudinal axis of the housing;

at least three spaced-apart adaptors positioned on a plane perpendicular to the longitudinal axis of the housing and on an outer surface of the housing;

a cylindrical handle perpendicular to the vertical handle, one end of the cylindrical handle is secured to a respective one of the adaptors to permit a custom configuration for a user to counter torque of the motor; and the appliance is portable and configured to apply wax and buff a surface of a vehicle.

2. The vehicle and buffing appliance as claimed in claim 1, further comprising another cylindrical handle that is removable and repositionable with respect to the housing, and wherein the adaptors that are inserted in the housing are non-rotating nuts with a threaded hole to which a respective one of the cylindrical handles is secured therein.

3. The vehicle waxing and buffing appliance as claimed in claim 2, wherein each of the nuts has an outer periphery shaped and configured to be non-rotatively inserted in the outer surface of the housing.

4. The vehicle waxing and buffing appliance as claimed in claim 2, wherein a front end of the cylindrical handle has a protruding threaded section configured to allow the handle to be screwed into one of the nuts.

5. The vehicle waxing and buffing appliance as claimed in claim 2, wherein both ends of the cylindrical handle include a protruding threaded section, one end thereof with a right hand thread and the other with a left hand thread such that the left hand thread or the right hand thread is selectable to be inserted into a corresponding thread of a selected one of the nuts.

6. The vehicle waxing and buffing appliance as claimed in claim 2, wherein the cylindrical handle includes a threaded section which is screwed into a respective one of the nuts, with a spring washer and a plastic washer installed on the threaded rod to lock the cylindrical handle therein.

7. The vehicle waxing and buffing appliance as claimed in claim 1, wherein a recess is formed at an outer periphery of a section where each of the adaptors is inserted, and further comprising sealing caps is installed into corresponding ones of the recesses where the cylindrical handle is not inserted.

* * * * *